1,436,961

Patented Nov. 28, 1922.

UNITED STATES PATENT OFFICE.

WOOLSEY McA. JOHNSON, OF HARTFORD, CONNECTICUT.

METALLURGY OF TIN.

No Drawing.   Application filed May 20, 1919.   Serial No. 298,413.

*To all whom it may concern:*

Be it known that I, WOOLSEY McA. JOHNSON, a citizen of the United States, residing at Hartford, in the county of Hartford, State of Connecticut, have invented certain new and useful Improvements in Metallurgy of Tin; and I do hereby declare the following to be a full, clear, and exact description of the invention, such as will enable others skilled in the art to which it appertains to make and use the same.

This invention relates to the reducing and refining of refractory ores, particularly those containing two or more elements which are separated with difficulty, the invention being particularly adaptable to the treatment of ores of tin, containing iron.

It is the object of my invention to provide a method of reducing and refining ores, wherein a sharp and well defined separation of the elements is possible, thus simplifying the operations required to recover the metal, increasing the efficiency of the reduction, and lowering the cost of operation thereof.

Another object of the invention is the provision of a simple and efficient method of recovering tin from its ores, particularly such as contain more or less iron and other elements including so-called "complex ores" containing sulfur, antimony, arsenic, bismuth, lead, silver and gold, as well as iron.

Further objects and advantages of my invention will be apparent as it is better understood by reference to the following specification containing a detailed statement of the best mode of applying my invention in specific cases, it being understood that the method will necessarily be varied in accordance with the peculiar characteristics of the ore treated.

In the following specification I shall describe the application of my invention particularly to ores of tin, by way of illustration and in order that a clear understanding of the method and its attendant advantages may be acquired. It is to be appreciated, however, that the principles which underlie the method are of general application to ores of similar character, and that the method may be advantageously employed in the reduction and recovery of other metals than tin from their ores.

Ores of tin generally carry more or less iron, some of which is susceptible to mechanical separation. A certain amount of iron invariably remains in the ore and its removal from the tin after reduction thereof is attended by numerous disadvantages, in the succession and variety of expedients which must be adopted, and in the more or less troublesome products which result from the various operations. In the smelting of tin ores as conventionally practiced in reverberatory or shaft furnaces, no sharp and clear cut separation of the tin from the iron is possible. The products of such an operation are crude tin containing iron and a slag high in tin oxide. The tin must be laboriously and expensively refined before it becomes a commercial product and the slag must be retreated to recover the tin therefrom.

I have discovered that a well defined separation of the tin and iron, in ores containing these metals, may be accomplished through the application of my invention as hereinafter described. In applying my method, the ore is subjected to a preliminary reduction in the presence of a reducing gas, such as hydrogen or carbon monoxide, under conditions carefully controlled and regulated to permit a selective or differential reduction of the tin oxide, leaving the iron oxide substantially unaffected, and favoring the reoxidation of any iron which may be reduced during the operation. The regulation contemplated involves the withdrawal of the gaseous "end-products" steam, carbon dioxide or mixtures thereof for example, depending upon the nature of the reducing gas employed, at such a rate as to permit reduction of the tin oxide with the greatest rapidity, while insuring the reoxidation of any reduced nascent iron. At the completion of the reaction all of the iron present is in the oxidized condition while substantially all of the tin is present in a metallic form. Such regulation is possible because the reaction is reversible and, therefore, strongly influenced in accordance with the law of mass action by the proportion of "end-products" which remain in contact with the material treated. Following the preliminary reduction, the ore is removed without contact with the atmosphere to a suitable furnace where it is smelted in contact with a slag which scorifies the iron present in the mass and leaves the tin in a substantially pure condition.

In carrying out the invention, the preliminary reduction is preferably conducted in a suitable retort or muffle, either of the vertical or inclined-rotary type, wherein the ore is subjected at a temperature which is preferably in the neighborhood of 600° to 750° C., to the reducing influence of hydrogen, carbon monoxide or other reducing gas, or mixture thereof, until the tin oxide has been completely reduced. Preferably, the gas is applied to the ore on the counter current principle, the fresh gas encountering the reduced ore. The end-products, which, in the event that hydrogen is employed as the reducing gas, will consist of a mixture of hydrogen and water vapor, are removed during the course of the reaction, the removal being regulated so that none of the iron is reduced below the ferrous oxide, while the stannic oxide is reduced at a maximum rate. The uncombined hydrogen is preferably recovered for re-use by passing the gas over calcium chloride, anhydrous sulfuric acid or other hydroscopic material, whereby the water is removed or by refrigeration and compressing. If carbon monoxide is employed as the reducing agent, the "end-products" will contain carbon monoxide and carbon dioxide. The carbon dioxide may be removed by absorption in calcium oxide and the carbon monoxide may then be re-used. A mixture of hydrogen and carbon monoxide may be advantageously employed, as a reducing agent, in which event the water and carbon dioxide are separated from the "end-products" by dehydration in the manner described and by contact with calcium oxide. Mixtures of hydrogen and carbon monoxide may be readily produced by electrolysis of water, providing hydrogen and oxygen, and the combination of the oxygen with carbon in a suitable gas producer.

The ore, following the preliminary reduction, is preferably treated in an electric furnace of the slag-resistance type. This type of electric furnace is not well adapted for reduction of ores because the chemical heat required for reduction is far greater than the sensible heat of melting and, when a strongly endothermic reduction must be performed, as in the present instance, the absorption of heat proceeds with such rapidity that the slag is chilled, unless great care be used, and the flow of heat through the chilled slag from the sources of generation to the points of utilization is slow and irregular. The slag-resistance furnace is, however, well adapted to the accomplishment of my present purpose. The ore is reduced prior to delivery to the furnace and is preheated. It does not chill the slag. Moreover, no heat is absorbed in reducing the ore in the resistance furnace so that the slag remains fluid and serves as an admirable vehicle for heat. Consequently, the consumption of power, under the conditions contemplated of preheating and pre-reducing the ore, is many times less than when a cold, non-reduced mixture is charged to the furnace for a far greater smelting rate is attained.

As a specific application of my invention, I shall describe the treatment of a typical ore of "complex" type containing Sn 69.0%, $SiO_2$ 3.5%, $Al_2O_3$ 2.0%, FeO 5.5%, together with traces of As, Sb Bi, S, Zn, Pb, Au and Ag. Such an ore is representative of the "Bolivian" tin concentrates which have heretofore been commercially undesirable because of the difficulty experienced in separating the tin content from the impurities mentioned. While available in considerable quantity, such ores have not been worked to any extent. Some ore of this type has been concentrated by wet methods when sufficiently rich, but such utilization has been limited, the ores being sold at a discount because of the expense involved in recovering the tin.

I have discovered that it is possible to separate the impurities in an inexpensive and efficient manner by heating the ore with chlorine at from 250° to 350° C. The tin, being present as oxide, $SnO_2$, is not affected by the chlorine, whereas arsenic, antimony, bismuth, and such of the tin as is present in the form of sulfide, are converted into the respective chlorides which may be fractionally separated by heating. Lead, zinc, iron, silver and gold, when present, are similarly converted into chlorides and chlorides of zinc, lead, gold and iron are removed by leaching with acidulated water and chloride of silver is separated by leaching with a solution of $Na_2S_2O_3$ or KCN. Thus a tin ore carrying small amounts of $Fe_2O_3$, $SiO_2$ and silicates is obtained which is comparable with "Cornish" tin ore. This ore is mixed with substantially 18.3% by weight of slag and 2.5% of CaO (93.6% pure). The slag employed is one of the products of the process, about 600 pounds being produced for every ton of ore smelted. The slag analyzes FeO 20%, CaO 20%, SnO 19% and $SiO_2$ 30%, undetermined 11%. The mixture is heated, in a vertical or inclined revolving muffle or retort, externally fired, to a maximum temperature of about 750° C. and a reducing gas analyzing, for example, 93% H, 2% $H_2O$ and 5% CO and $CO_2$ is conducted through the retort in contact with the charge. The operation of preliminarily reducing the ore may be conducted continuously or intermittently. If the character of the ore is such as to make control of the reaction difficult, intermittent operation is recommended.

Where a revolving muffle is employed, the tin, after reduction forms a mass of small molten pellets separated by the non-fusible portion of the charge which amounts generally by volume to 90% of the metal. Where a revolving muffle is used, a lower temperature than 750° C. suffices for the accomplishment of the desired result, inasmuch as the reduced metal is removed from the surface of the tin oxide particles by the particles of molten metal, which, through the agitation of the charge, contact successively with the particles of unreduced material. The lower temperature favors the product because any iron reduced is not so readily absorbed by the tin and is permitted to re-oxidize in contact with the "end-products," which are withdrawn at a carefully regulated rate, calculated to insure the desired results. The reaction may also be assisted by the introduction of small amounts of air which instantaneously oxidize nascent, and therefore, pyrophoric iron, while the tin is comparatively unaffected. The reduced material is then removed, either directly, or through the intermediary of a hermetically sealed ore car, into a slag resistance electric furnace. Here the mass is heated to a temperature of substantially 1200° C. with the result that the iron is scorified providing a slag above referred to, analyzing, for example, FeO 20%, CaO 20%, SnO 19% and $SiO_2$ 30%. The tin is separated and carries substantially 1% of iron. The crude tin is heated in contact with the slag, either in the same or another furnace permitting the iron in the slag to react with any stannous oxide present to produce tin and ferrous oxide and a refined tin is obtained carrying not more than .25% impurities.

In the event that an extremely pure tin is required, the pre-reduced ore is cooled in a reducing atmosphere, for example, hydrogen, and is refined electrolytically in a "Thum box-anode" employing a porous diaphragm and active circulation of the electrolyte. A product which is 99.95% pure tin is thus produced.

The foregoing description should enable any person skilled in the art to practice the invention in its application to the reduction of tin ores, as well as to the treatment of other ores of similar characteristics. For example, ores or iron and manganese ore containing iron, copper and nickle may be similarly smelted. For the oxides of the more difficultly reducible metals such as aluminum and manganese, I preferably employ a metallic vapor such as zinc at a temperature of from 1700 to 1800° C. as the reducing agent in place of hydrogen or carbon monoxide. Zinc oxide being volatile may be readily eliminated from the reducing zone as formed. By removing instantaneously or at a highly intense rate the "end-products" of the reaction, the counter-reaction has a value which may be made infinitely small. Thus by passing the stream of reducing agent at the highest practicable rate the reduction of a most difficultly reducible metal may be carried on by a very weak reducing agent.

I have perfected, as above indicated, a method of reducing and refining which is particularly applicable to ores containing elements ordinarily separated with difficulty. As will be understood from the foregoing description, I am thus enabled to recover metals from such ores with facility heretofore impossible, because of the complex operations to which the ores were necessarily subjected. Various changes may be made in the details of the method, and the character and proportions of the materials employed without departing from the invention or sacrificing any of its material advantages.

I claim:

1. A method of reducing ores containing a plurality of difficultly separable elements, which comprises, subjecting the ore to a preliminary reduction, regulating the withdrawal of the gaseous product of the reaction to permit a selective reduction of one of the elements, and subsequently heating the mass in the presence of slag forming material to scorify the unreduced element.

2. A method of reducing ores containing tin and iron, which comprises, subjecting the ore to a preliminary reduction, regulating the withdrawal of the gaseous product of the reaction to permit selective reduction of the tin and subsequently heating the mass in the presence of slag forming material to scorify the iron.

3. A method of reducing ores containing a plurality of difficultly separable elements, which comprises, subjecting the ore to a preliminary reduction, with a gaseous reducing medium, regulating the withdrawal of the gaseous product of the reaction to permit selective reduction of one of the elements, and subsequently heating the mass with slag forming material to scorify the unreduced element.

4. A method of reducing ores containing tin and iron, which comprises, subjecting the ores to a preliminary reduction with a gaseous reducing medium, regulating the withdrawal of the gaseous product of the reaction to permit selective reduction of the tin and subsequently heating the mass with slag forming material to scorify the iron.

5. A method of reducing ores containing tin and iron, which comprises, mixing the ore with slag forming material, reducing the tin under conditions preventing reduction of the iron therein and subsequently heating the mass to scorify and separate the iron from the tin.

6. A method of reducing ores containing iron and tin, which comprises, mixing the ore with slag forming material, subjecting the mass to the action of a gaseous reducing medium, effecting the withdrawal of gaseous reduction products to permit intensive reduction of the tin and heating the mass to scorify and separate the iron from the tin.

7. A method of reduction comprising the use of an intensive stream of gaseous reducing agent flowing over, around and through the compound to be reduced and removing at a highly accelerated rate the "end-products" of reduction and regenerating said used reducing agent by removing the "end-products" carried therein.

8. A method of reducing ores containing iron and tin, which comprises, mixing the ore with slag forming material, subjecting the mass to the action of a gaseous reducing medium, regulating the conditions of the reduction to prevent reduction of iron in the mass and heating the mass to scorify and separate the iron from the tin.

9. A method of reducing ores containing iron and tin, which comprises, subjecting the ore at a temperature from 600°–750° C. to the action of a gaseous reducing medium, and subsequently heating the mass to a temperature of substantially 1200° C, in the presence of slag forming material to scorify and separate the iron from the tin.

10. A method of reducing ores containing tin and iron, which comprises, subjecting the ore to the reducing action of a gaseous medium in which hydrogen predominates, regulating the reaction to prevent reduction of the iron and subsequently heating the mass in the presence of slag forming material to separate the iron from the tin.

11. A method of reducing ores containing tin and iron, which comprises, subjecting a mixture of the ore and slag forming material to the action of a gaseous reducing medium under conditions precluding the reduction of iron and subsequently heating the mass to a temperature appropriate to the scorification and separation of the iron.

12. The process of chloridizing at around 300° C. complex tin ores so as to remove elements which form volatile chlorides and leaching out elements which form solid chlorides, so as to prepare a simple tin ore from complex tin ores.

13. A method of treating complex tin ores to recover tin therefrom, which comprises, chloridizing the ore, thereby converting the impurities into chlorides, separating the chlorides, heating the ore with a gaseous reducing agent, regulating the reaction to selectively reduce the tin and separating the tin.

14. A method of treating complex tin ores containing iron and other impurities to recover tin therefrom, which comprises, chloridizing the ore, thereby converting the impurities into chlorides, separating the chlorides, heating the ore with a gaseous reducing agent to reduce the tin and smelting the ore with a slag forming material to scorify the iron.

15. A method of treating complex ores containing iron and other impurities to recover tin therefrom, which comprises, chloridizing the ore, thereby converting the impurities into chlorides, separating the chlorides, heating the ore with a gaseous reducing agent, regulating the reaction to reduce the tin without reducing the iron, and smelting the ore with slag forming material to scorify the iron.

In testimony whereof I affix my signature.

WOOLSEY McA. JOHNSON.